United States Patent Office 3,207,674
Patented Sept. 21, 1965

3,207,674
PROCESS OF PRODUCING FIBRINOLYTIC MATERIAL FROM CEPHALOSPORIUM
Michael A. Pisano, 11 Lawrence Road, Hempstead, N.Y., and Walter S. Oleniacz, 195—05 39th Ave., Flushing, N.Y.
No Drawing. Filed July 15, 1963, Ser. No. 295,228
3 Claims. (Cl. 195—66)

The present invention relates to a fibrinolytic substance and particularly to a new and useful fibrinolytic substance, which we have termed "Fibroceph," and the process for preparing or producing the same.

Fibroceph is produced by the cultivation of a soil fungus under certain conditions. The organism, identified as Cephalosporium, sp. 3C, has been deposited in the American Type Culture Collection and assigned ATCC 15006. This organism has the following morphological and taxonomic characteristics:

*Habitus.*—Grown on the following agars: malt, oatmeal, potato dextrose and Czapek Dox the fungus develops a wrinkled, moist and smooth membrane which easily can be pulled off the agar. Growth is best on malt agar. A yellow pigment is developed in the mycelium; it sometimes diffuses into the medium especially into oatmeal agar. When the cultures are kept in the light, the yellow colour may turn into pink. According to Ridgway the colour of two months old cultures, kept in the light, are: on malt agar pl. XV antimony yellow to warm buff, on oatmeal agar pl. II safrano pink, on potato dextrose agar pl. XV pale ochraceous salmon, on Czapek Dox agar pl. XIV seashell pink.

*Morphology.*—Conidia oblong oval, sometimes lightly curved, with oildrops, 5–11 x 1.1 x 3.3$\mu$ are developed at the top of long conidiophores. They stick together in slimy heads. Conidiophores 16–50 x 2.2–2.5$\mu$ more or less wavy especially at the top. Numerous oblong pieces of mycelium, rounded at both ends, sometimes with a septum, up to 16.5 x 2.2–2.5$\mu$ occur in the mycelium. Because of the way in which the conidia originate the fungus belongs into the genus Cephalosporium.

Fibroceph is a fibrinolytic substance which lyses preformed human plasma clots and also prevents plasma clot formation under specified conditions. Fibroceph also lyses fibrin clots prepared from the interaction of purified fibrinogen and thrombin preparations. When Fibroceph is mixed with fibrinogen and thrombin, fibrin clot formation is prevented.

Fibroceph can be produced by the submerged aerobic cultivation of Cephalosporium sp. 3C (ATCC 15006) for about four days in an aqueous organic medium of the corn meal-soybean meal type having available sources of carbon and nitrogen at a temperature of about 25–37° C. and at a pH of about 7–8.5. A pH of about 8.2 is preferred with the addition of a small amount of calcium carbonate or the like to prevent any excessive drop in pH at the start of fermentation. The following examples will serve to illustrate the invention.

EXAMPLE I

*Production.*—Fibroceph is produced by the cultivation of Cephalosporium sp. 3C (ATCC 15006) in a culture medium consisting of corn meal, 20 g.; soybean meal, 10 g.; and calcium carbonate, 5 g.; all added to one liter of tap water. The initial pH of the medium was approximately 8.2. Flasks containing the culture medium were inoculated with the organism and allowed to incubate at 28.5° C. on a rotary shaker. After approximately 96 hours incubation, the flasks were removed from the shaker and the culture fluid was filtered through paper. The pH of the filtrate obtained measured 7.8–8.9. At this point, the filtrate contained approximately 200 caseinolytic units per ml. The filtrate was also active against each of the following substrates: gelatin, bovine beta-lactoglobulin, denatured hemoglobin, soybean alpha-protein, bovine albumin fraction V, starch and N-acetyl-glucosamine. In addition, the filtrate displayed milk-clotting activity.

EXAMPLE II

*Method of assay.*—Caseinolytic activity was determined by the method described by Sgouris, Inman, McCall and Anderson and published in Vox Sanguinis, vol. 6, pages 53–59, in 1961. The procedure consists of placing 0.1 ml. of the test sample and 1.9 ml. of pH 7.4 buffer (0.1 molar phosphate-saline) and 4 ml. of 6 percent casein in a test tube and bringing the mixture to 37° C. A 2.0 ml. aliquot is immediately removed (zero time) and another is removed after 60 minutes. Each aliquot is added to an equal volume of 10 percent trichloracetic acid. Three ml. of water are added and the mixture is passed through filter paper. The optical densities of the filtrates are read against a water blank at 2800 A. The difference in the optical densities from zero to 60 minutes is converted to micrograms of acid-soluble tyrosine by reference to a standard curve. One caseinolytic unit has been defined as that amount of enzyme producing an increase of 450 micrograms of acid-soluble tyrosine in a 4 percent casein medium in one hour at 37° C. Assay results are quantitated in terms of caseinolytic units (C.U.) per volume of liquid or per weight of solids or nitrogen.

EXAMPLE III

A. *Properties of the crude enzyme.*—The culture filtrates of Cephalosporium sp. 3C (ATCC 15006) displayed enzymatic activity against a variety of substrates. Of particular interest was the lytic activity of the filtrates against human plasma clots. In a typical experiment, plasma clots prepared by recalcification of human plasma, were overlayed with 0.5 ml. of filtrate. Active filtrates liquified the exposed clot surface and the height of the remaining, nonhydrolyzed portion of the clot was measured after 12 hours incubation at 37° C. Percent lysis was calculated by comparing the height of the individual clots before and after exposure to the filtrates. Appropriate controls were employed to insure that spontaneous lysis of the clots did not occur. Under the conditions described, approximately 22 percent of the plasma clot was lysed by the filtrates.

With Hammersten casein serving as substrate, greatest activity was noted at pH 7.5. When either denatured hemoglobin or beta-lactoglobulin was substituted for the Hammersten casein, maximum activity occurred at pH 8.5. The crude enzyme was stable within a pH range of 3.0 to 9.5 at 5° C. for 24 hours and at 25° C. for 2 hours. Maximum stability was recorded at approximately pH 8.0. The enzyme was inactivated by heating at 70° C. for 10 minutes. The enzyme is soluble in water, insoluble in acetone, methanol and 80 percent saturated ammonium sulfate and non-dialyzable through cellulose (cellophane) membranes.

B. *Effect of trypsin inhibitors.*—Various trypsin inhibitors were employed to determine their effect on the activity of the protease obtained from Cephalosporium sp. 3C (ATCC 15006). The results obtained are illustrated in the following table:

| Substance: | Percent inactivation |
|---|---|
| Soybean trypsin inhibitor | 0 |
| Lima bean trypsin inhibitor | 31 |
| Ovomucoid trypsin inhibitor | 100 |

The data obtained suggest that the Cephalosporium protease may be distinguished from trypsin by the use of the trypsin inhibitors.

EXAMPLE IV

*Isolation and purification.*—The following example illustrates a method of isolation and purification but does not limit the isolation and purification procedures. Solid lead acetate was added in a final concentration of 3 percent to the fermentation filtrate which had a pH of 8.3. The filtrate assayed at 56 C.U./mg. solids. The mixture was stirred constantly for 30 minutes at 5° C. Impurities precipitated by the lead acetate were removed by centrifugation at 3000 r.p.m. at 0° C. for 20 minutes. The precipitate was discarded and the supernatant dialyzed for 24 hours at 5° C. against cold distilled water. Following dialysis, a precipitate settled out of solution in the non-dialyzable fraction. The precipitate was removed by centrifugation at 8000 r.p.m. at 0° C. for 20 minutes. Two volumes of acetone maintained at −12° C., were then added, with stirring, to the supernatant. The acetone-supernatant mixture was allowed to stand overnight at −20° C. to allow for complete precipitation of the active enzyme. At the end of the period, the flocculent precipitate was removed by centrifugation at 8000 r.p.m. at 0° for 20 minutes. The resulting supernatant was discarded, and the precipitate was suspended in 500 ml. distilled water. The suspension which formed was centrifuged to remove any insoluble, inactive residue. Two volumes of absolute methanol maintained at −12° C. were added to the supernatant, and the mixture was allowed to stand at −20° C. for 3 hours. A white flocculent precipitate formed which was removed by centrifugation at 8000 r.p.m. at 0° C. for 20 minutes. The supernatant was discarded and the precipitate was suspended in 100 ml. distilled water. The suspension was recentrifuged to remove insoluble impurities. The supernatant was next dialyzed against repeated changes of cold distilled water for 24 hours at 5° C. The non-dialyzable fraction was lyophilized to yield a white powder. The yields and specific activities of various fractions obtained in this procedure are illustrated in the following table:

| Fraction | Percent activity | Specific activity, C.U./mg. solids | Purification ratio |
|---|---|---|---|
| Culture filtrate | 100 | 56 | 1.0 |
| Dialyzed lead acetate supernatant | 85 | 318 | 5.7 |
| Acetone precipitate, soluble fraction | 46 | 1,026 | 18.3 |
| Methanol precipitate, soluble fraction | 39 | 1,608 | 28.7 |
| Dialyzed methanol precipitate | 39 | 1,591 | 28.4 |

EXAMPLE V

*Properties of the purified enzyme*

A. *Absorption spectra.*—Maximum absorption in the ultraviolet region of the spectrum was noted in the range of 2750–2800 A. with peak absorption at 2770 A. Characteristic absorption bands were also obtained in the infrared region of the spectrum when the purified enzyme was incorporated into a KBr disc. Significant absorption occurred at the following frequencies: 3.0, 3.45, 6.05, 6.3, 7.15, 8.1, and 9.5 microns. A broad peak was noted at 9.2–9.7 microns.

B. *Chemical tests.*—The presence of carbohydrate was established by a positive Molisch test. The Seliwanoff test for ketoses was negative. The iodine test for simple polysaccharides was also negative. The presence of protein was verified by the biuret xanthoproteic and ninhydrin reactions.

C. *Chemical composition.*—The chemical composition of the enzyme preparation obtained according to the isolation and purification procedure described, is shown in the following table:

| Substance: | Composition, percent |
|---|---|
| Carbon | 45.73 |
| Hydrogen | 6.69 |
| Nitrogen | 13.28 |
| Chlorine | 0.49 |
| Sulfur | 0.00 |
| Phosphorus | 0.00 |
| Ash | 3.25 |
| Oxygen (by difference) | 30.56 |

Protein made up 85–90 percent of the total composition.

D. *Direct fibrinolytic activity.*—A lyophilized preparation of the purified enzyme, which had an activity of 311 C.U./mg. was assayed for direct fibrinolytic activity according to the heated fibrin plate method of Sgouris, Inman and McCall (Biochem. Biophys. Research Commun., vol. 2, page 40, 1960). When 0.08 ml. of a sample containing 160 μg. of the enzyme was placed on a heated fibrin plate and incubated at 37° C. for 18 hours, a cleared zone, measuring 4 cm. in diameter, was found when the plate was flooded with 10% aqueous trichloracetic acid. This result is indicative of direct fibrinolytic activity.

The product of the present invention, Fibroceph, can be used to advantage by diagnostic laboratories to lyse blood clots found in blood obtained from blood banks. Such blood is often used in the preparation of culture media. The presence of clots is undesirable in that they interfere with the preparation of suitable agar substrates containing blood. In addition, the clots alter the composition of the blood fraction.

Specifically, according to the activity of Fibroceph reported here, the admixture of the latter substance with clot-containing blood prior to the preparation of the culture medium will produce a blood free of clots, suitable for use in the preparation of blood agar plates. In addition, the admixture of Fibroceph with stored blood intended for use in blood agar plates will prevent the formation of clots.

We claim:

1. A process for the production of fibrinolytic substance comprising cultivating a culture medium with available sources of carbon and nitrogen and inoculated with the organism, Cephalosporium sp. 3C (ATCC 15006), and separating from the culture medium a fibrinolytic substance-containing material.

2. A process for the production of fibrinolytic substance comprising cultivating under aerobic conditions an aqueous organic culture medium containing corn meal, soybean meal and calcium carbonate and inoculated with the organism, Cephalosporium sp. 3C (ATCC 15006) at about 25 to 37° C. for about four days, and separating from the culture medium a fibrinolytic substance-containing material.

3. The process of claim 2 where the organism (ATCC 15006) is cultivated at about 28.5° C. and at a pH of about 8.2, the cultured medium is filtered, the resulting filtrate is treated with lead acetate to remove impurities as a precipitate, the resulting solution is dialyzed, and the non-dialyzable fraction is fractionated with acetone and then absolute methanol to yield an active precipitate which is suspended in water and lyophilized to a dry, white powder.

References Cited by the Examiner

UNITED STATES PATENTS 3,094,527   6/63   Florey et al. _____ 195—36 X

OTHER REFERENCES

Pisano et al.: Applied Microbiology, vol. 11, pages 111–115, March 1963.

Stefanini et al.: Proceedings Society for Experimental Medicine and Biology, vol. 99, pp. 504–507.

A. LOUIS MONACELL, *Primary Examiner.*